(12) United States Patent
Diana et al.

(10) Patent No.: US 12,062,961 B2
(45) Date of Patent: Aug. 13, 2024

(54) INTEGRATED ELECTRIC DRIVE WITH COOLING DEVICE

(71) Applicant: POLITECNICO DI TORINO, Turin (IT)

(72) Inventors: Michela Diana, Turin (IT); Paolo Guglielmi, Turin (IT)

(73) Assignee: POLITECNICO DI TORINO, Turin (IT)

( * ) Notice: Subject to any disclaimer, the term of this patent is extended or adjusted under 35 U.S.C. 154(b) by 297 days.

(21) Appl. No.: 17/618,532

(22) PCT Filed: Jun. 12, 2020

(86) PCT No.: PCT/IB2020/055516
§ 371 (c)(1),
(2) Date: Dec. 13, 2021

(87) PCT Pub. No.: WO2020/250184
PCT Pub. Date: Dec. 17, 2020

(65) Prior Publication Data
US 2022/0247249 A1     Aug. 4, 2022

(30) Foreign Application Priority Data
Jun. 13, 2019 (IT) .......................... 102019000008916

(51) Int. Cl.
| | | |
|---|---|---|
| *H02K 3/24* | (2006.01) | |
| *H02K 3/52* | (2006.01) | |
| *H02K 9/22* | (2006.01) | |

(52) U.S. Cl.
CPC ............... *H02K 3/24* (2013.01); *H02K 3/522* (2013.01); *H02K 9/227* (2021.01); *H02K 2203/09* (2013.01)

(58) Field of Classification Search
CPC .......... H02K 3/24; H02K 3/522; H02K 9/227; H02K 2203/09
See application file for complete search history.

(56) References Cited

U.S. PATENT DOCUMENTS

| | | |
|---|---|---|
| 7,061,149 B2 | 6/2006 | Crane et al. |
| 11,374,453 B2 * | 6/2022 | Dajaku ................. H02K 17/14 |
| | (Continued) | |

FOREIGN PATENT DOCUMENTS

| | | |
|---|---|---|
| DE | 102012217778 | 4/2014 |
| FR | 2963174 | 1/2012 |
| WO | WO 2017/187296 | 11/2017 |

OTHER PUBLICATIONS

Machine translation of Petitboulanger et al., FR2963174A1, Apr. 3, 2014 (Year: 2014).*

(Continued)

*Primary Examiner* — Bernard Rojas

(57) ABSTRACT

It is described a stator for an electric machine comprising: a hollow main body; a plurality of supporting teeth extending along an inner surface of said main body; a plurality of windings, each one engaged to a respective one of said supporting teeth; a plurality of operating elements, each one interposed between two successive windings; each one of said operating elements being suitable for thermally interacting with at least one of said windings to cool said at least one winding; each one of said operating elements being in electrical contact with a respective winding of competence being part of said plurality of windings, each operating element being configured to be traversed by a current suitable for supplying said winding of competence.

14 Claims, 4 Drawing Sheets

(56) References Cited

U.S. PATENT DOCUMENTS

| | | | |
|---|---|---|---|
| 2006/0002054 A1* | 1/2006 | Anwar | H02P 25/18 |
| | | | 361/271 |
| 2016/0028284 A1 | 1/2016 | Dajaku | |
| 2016/0087497 A1 | 3/2016 | Patzak et al. | |

OTHER PUBLICATIONS

International Search Report and the Written Opinion Dated Jul. 21, 2020 From the International Searching Authority Re. Application No. PCT/IB2020/055516. (9 Pages).

* cited by examiner

INTEGRATED ELECTRIC DRIVE WITH COOLING DEVICE

RELATED APPLICATIONS

This application is a National Phase of PCT Patent Application No. PCT/IB2020/055516 having International filing date of Jun. 12, 2020, which claims the benefit of priority of Italy Patent Application No. 102019000008916 filed on Jun. 13, 2019. The contents of the above applications are all incorporated by reference as if fully set forth herein in their entirety.

FIELD AND BACKGROUND OF THE INVENTION

The present invention generally relates to the electrical machines sector. In particular, the present invention relates to an integrated electric drive with an cooling device for electric machines.

As is known, electric machines (motors and/or generators), such as electric motor/generator, have a power/weight ratio whose upper limit is mainly due to the Joule effect losses occurring in the stator of the electric machine.

The windings, due to the electrical current flowing through it, generates heat during operation. The heat causes an increase of the temperature of the conductors forming the windings and, therefore, also of the insulator materials separating each winding.

In particular, an increase of the temperature of the conductors causes an increase in the resistivity of the conductors themselves allowing, applying the same voltage and/or magnetic flux variation, the passage of a lower current intensity, limiting the maximum power supplied/produced by the electric machine in case of small machines, and, in case of large machines, generating a greater quantity of losses thus reducing the efficiency.

In order to limit said effects, it is known to use cooling systems reducing the temperature of components of the electric machine.

Known fluid cooling systems are classified as: direct cooling systems; and indirect cooling systems.

In particular, in direct cooling systems, the conductors dissipating heat by Joule effect are in direct contact with the refrigerant fluid; vice versa considering indirect cooling systems, the conductors are not in direct contact with the refrigerant fluid. The latter system is implemented, for example, by means of external jackets, involving a ferromagnetic circuit, or by means of a system known as "in slot cooling system" without involving the ferromagnetic circuit.

Disadvantageously, these systems are expensive and, furthermore, they could occupy a non-negligible volume, increasing the size of the electric machine.

Disadvantageously, installing the electric motor in watertight compartments (e.g. in the compartment housing the engine of an electric car) or in locations of limited size (e.g. in the central body of a bicycle frame) is difficult when the volume increases due to the cooling systems, and it is also necessary to take into account the thermal load (heat output) to be disposed for ensuring the efficiency of the electric motor. In fact, as previously mentioned, temperature increasing leads to a decrease of the efficiency (assuming the same output power) and, in case of an electric motor for an electric vehicle, causes a reduction of the vehicle autonomy.

As is known, electrical machines are provided with power and control electronics to form an electric drive. These elements are usually housed in dedicated spaces, requiring dedicated connection cables and/or special interfaces.

Disadvantageously, said dedicated components further limit the design of electrical machines. In particular, the dedicated components imply the use of a greater number of both electrical and mechanical components, increasing the complexity of the assembly process of the electrical machine itself.

Disadvantageously, some applications require a cooling system for both the mechanical components (e.g. the stator) and the electrical components, increasing even more the overall dimension of the electrical drive.

The Applicant has noted that it is desirable to provide an electrical machine that overcomes the aforementioned problems.

In particular, the Applicant has noted that it is desirable to provide a cooling device and an electrical drive circuit with reduced costs while ensuring the same performance.

Furthermore, the Applicant has noted that it is desirable that the electrical drive circuit and/or the cooling device has/have a reduced volume.

Furthermore, the Applicant has noted that it is desirable to increase the penetration of the power electronics, ensuring advantages in terms of electrical compatibility and/or reducing the number of electrical and/or mechanical connections of the electrical machine itself.

Finally, the Applicant has noted that it is desirable, in case of coaxial electric motors/generators, to place the converter, the power electronics, the cooling circuit and the stator of an electric motor in the smallest volume.

SUMMARY OF THE INVENTION

The purpose of the present invention is to provide an electrical drive with integrated cooling device for electrical machines which overcomes the aforesaid problems.

According to a first aspect, the present invention provides
  a stator for an electric machine comprising:
    a hollow main body;
    a plurality of supporting teeth extending along an inner surface of said main body;
    a plurality of windings, each one engaged to a respective one of said supporting teeth;
    a plurality of operating elements, each one interposed between two successive windings;
    each one of said operating elements being suitable for thermally interacting with at least one of said windings to cool said at least one winding;
    each one of said operating elements being in electrical contact with a respective winding of competence being part of said plurality of windings, each operating element being configured to be traversed by a current suitable for supplying said winding of competence.

According to an embodiment of the present invention, said stator comprises a first ring and a second ring; each operating element is electrically connected to said first ring by means of a first switch and to said second ring by means of a second switch; each first switch and each second switch being configured to be driven by means of a respective command signal suitable for open/close said first switch and/or said second switch.

According to an embodiment of the present invention, said first ring and said second ring are respectively provided with a first connector and a second connector, said first connector and said second connector being configured to allow the application of a potential difference between said first ring and said second ring.

According to a further embodiment, each operating element is provided, internally, with a duct coated with an electrical insulating material, said duct being configured to flowing a refrigerant fluid suitable for cooling said winding of competence.

According to a further aspect the present invention provides an electric machine comprising:
 a. a stator according to embodiments of the present invention;
 b. a rotor magnetically coupled to said stator, said rotor being coaxial with respect to said stator and suitable for rotating about its own central axis.

Additional advantageous features of the present invention are object of the attached dependent claims.

BRIEF DESCRIPTION OF THE SEVERAL VIEWS OF THE DRAWINGS

The present invention will be clearer from the following detailed description provided as an example and not as a limitation, to be read with reference to the attached drawings wherein.

In the attached figures, elements that are basically similar and/or perform basically the same functions, are indicated with the same reference number.

DESCRIPTION OF SPECIFIC EMBODIMENTS OF THE INVENTION

Figure 1:
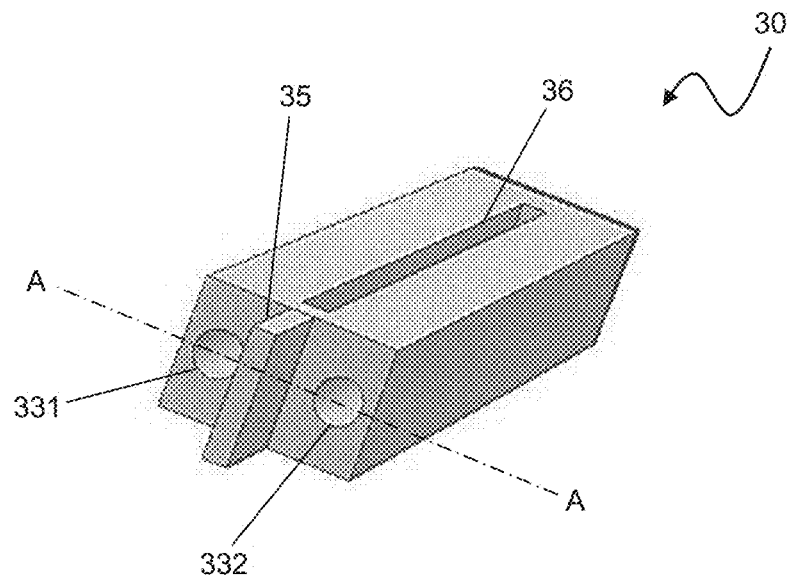
FIG. 1 is a perspective view of an operating element of a stator according to an embodiment of the present invention.

According to embodiments, the present invention provides an electric machine 1 comprising a stator 100.

The stator 100 is provided with a main body 10 having a longitudinally elongated shape. The main body 10 has an inner cavity. Preferably, said inner cavity extends longitudinally within the main body 10 and is provided with a main axis. Preferably, the inner cavity extends through the main body 10. Optionally, the inner cavity of the main body 10 is basically cylindrical.

Preferably, the main body 10 is made of a ferromagnetic material.

The main body 10 is provided with a plurality of supporting teeth 11. Preferably, each supporting tooth 11 has an elongated shape and extends along an inner surface of the inner cavity of the main body 10, preferably, each supporting tooth 11 extends parallel to the central axis of the main body 10.

As example, each supporting tooth 11 is basically a prism, preferably having a trapezoidal section, having a larger base facing and in contact with the inner surface of the main body 10 and tapering directed towards a radial central area of the main body 10 itself.

Each supporting tooth 11 is adapted to engage a respective winding 20 made of a wire or plate of conductive material, e.g. copper, silver or aluminium. As example, each winding 20 could be made winding the wire directly around the respective supporting tooth 11. Preferably, the wire is coated with an electrically insulating material.

It has to be noted that each winding 20 behaves like an inductance. Namely, supplying an electric current to at least one winding 20 a magnetic field is generated. Preferably, the magnetic field extends inside the stator 100 and closes within the main body 10.

According to an embodiment, after each winding 20 is engaged to the respective supporting tooth 11, a space is formed between two successive windings 20. Each space, also known as "slot", extends along the development axis of the main body 10 of the stator 100.

Figure 3:
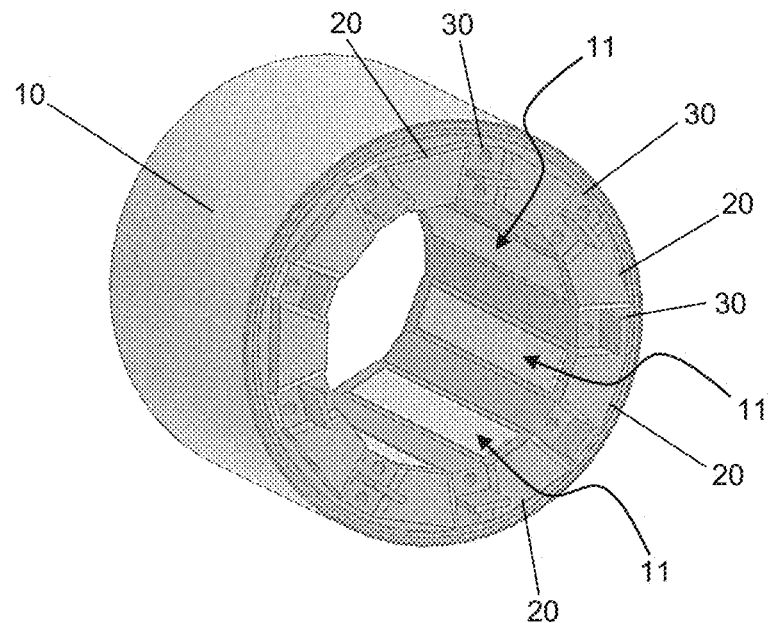
FIG. 3 is a perspective view of a part of a stator according to an embodiment of the present invention.

As shown in FIGS. 3 and 4, each supporting tooth 11 preferably has a cross-section shaped as an isosceles trapezium.

Figure 2:
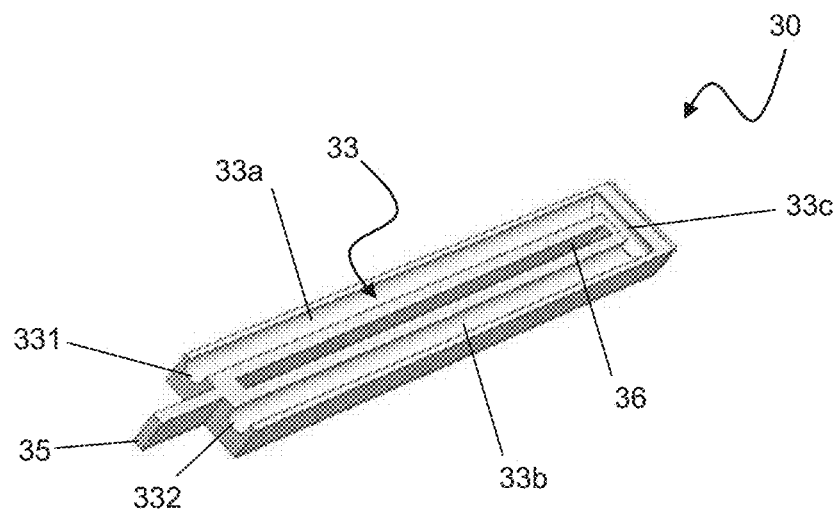
FIG. 2 is a cross-section view along the plane of plane A-A of the operating element of FIG. 1.

With reference to FIGS. 1, 2 and 3, each slot of the stator 100 is adapted to engage a respective operating element 30. The operating element 30 is made of a material suitable for conducting both electrically and thermally for reasons that will be described in detail below. For example, the operating element 30 is made of copper or aluminium. Optionally, the operating element 30 has a sandwich structure. Preferably, said sandwich structure comprises a plurality of conductive material layers and insulating material layers properly arranged.

Preferably, each operating element 30 has an elongated conformation provided with a longitudinal development direction, said longitudinal development direction being parallel to the central axis of the main body 10.

According to an embodiment, each operating element 30 has a rectangular cross-section, wherein the largest sides are arranged in a radial direction of said main body 10.

Therefore, the stator 100 comprises a plurality of operating elements 30, each operating element 30 engages a respective slot and is interposed between two adjacent windings 20. Preferably, the operating elements 30 are circumferentially arranged along the inner surface of the main body 10 of the stator 100.

Preferably, the surface of the operating element 30 facing the adjacent winding 20 is designed to have the maximum possible contact area with the adjacent winding 20. For example, said surface of the operating element 30 can be shaped to accommodate a portion of the adjacent winding 20 for reasons that will be described in detail below. For example, said surface of the operating element 30 may be provided with grooves, said grooves partially housing a respective coil of the adjacent winding 20.

Alternatively, an intermediate layer is placed between the operating element 30 and the adjacent winding 20. Said intermediate layer, as example, is designed to house the coils of the adjacent winding 20 and electrically insulating the adjacent winding 20 from the operating element 30. Said intermediate layer does not thermally insulate the operating element 30. As example, the intermediate layer may be made in: Kapton PTFE, Mylar Mica Nomex, impregnation resins or ceramic materials such as: SiC, SiSi, AlSic, AlN.

Therefore, each operating element 30 can thermally interact with at least one adjacent winding 20. In other words, the heat—generated by Joule effect—by the winding 20 is transmitted (for example, by conduction) to the operating element 30.

As shown in FIGS. 1 and 2, each operating element 30 is internally provided with a duct 33 for the refrigerant fluid.

Preferably, the duct 33 is internally coated with an electrically insulating material. Optionally, the duct 33 is internally and externally coated with an electrically insulating material. Preferably, the duct 33 can be a pass-through duct 33, namely, the duct 33 has an inlet 331 and an outlet 332 placed at two opposite surfaces of the operating element 30.

Alternatively, as shown in FIGS. 1 and 2, the duct 33 can be made placing the inlet 331 and the outlet 332 on the same surface. Preferably, the duct 33 has a first and a second section 33a, 33b, parallel to each other and parallel to the longitudinal development of the operating element 30, and a connecting section 33c. One end of the first section 33a corresponds to the inlet 331 and one end of the second section 33b corresponds to the outlet 332; the connecting section 33c connects the other end of the first section 33a to the other end of the second section 33b.

Optionally, the operating element 30 has a central recess 36, preferably, the central recess 36 is a passing through central recess 36. The recess 36 extends parallel to the longitudinal development axis of the operational element 30.

Preferably, the central recess 36 is placed between the first and the second section 33a, 33b of the duck 33.

As mentioned above, each operating element 30 is suitable for thermally interacting with at least one respective winding 20. In this way, when the windings 20 are in operation (i.e. when an electrical current flows through the winding 20), the heat generated by the Joule effect is transmitted to the operating element 30 through the contact surface or through the intermediate layer.

The operating element 30 transmits the heat received from the adjacent winding 20 to the refrigerant fluid flowing in the duct 33 as will be described in detail below.

Figure 5:
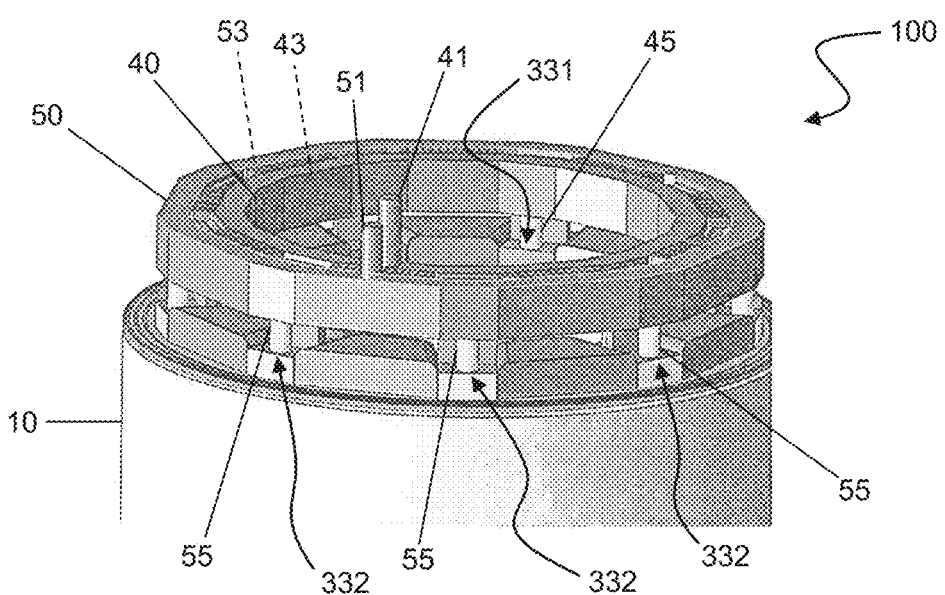
FIG. 5 is a perspective view of a part of the stator according to an embodiment of the present invention.

Referring to FIG. 5, according to embodiments of the present invention, the stator 100 comprises a first ring 40 and a second ring 50. Preferably, the first ring 40 and the second ring 50 are made of an electrically conductive material.

Preferably, the first ring 40 and the second ring 50 are made of a thermally conductive material. For example, the first ring 40 and the second ring 50 are made of aluminium or copper.

Preferably, the first ring 40 has a smaller diameter compared to the diameter of the second ring 50.

Preferably, the first ring 40 and the second ring 50 are placed so as to be basically coaxial with each other, even more preferably, the first ring and the second ring are coaxial with the longitudinal axis of main body 10 of the stator 100.

Preferably, the first ring 40 is placed in a radially internal region of the second ring 50.

Preferably, the first ring 40 and the second ring 50 are mounted at an axial end of the main body 10 of the stator 100. Preferably, the first ring 40 and the second ring 50 are mounted at the same axial end of the main body 10.

The first ring 40 is internally provided with a first cavity 43 and a plurality of first connecting elements 45. Optionally, the first cavity 43 is electrically insulated. Similarly, the second ring 50 is internally provided with a second cavity 53 and a plurality of second connecting elements 55. Optionally, the second cavity 53 is electrically insulated.

The first and second connecting elements 45, 55 are coated with an electrically insulating material.

Preferably, each first connecting element 45 puts in fluid communication the first cavity 43 and the duct 33 of a respective operating element 30. As example, each first connection element 45 is connected to the inlet 331 of the duct 33 of a respective operating element 30. Similarly, each second connecting element 55 puts in fluid communication the second cavity 53 with the duct 33 of a respective operating element 30. As example, each second connection element 55 is connected to the outlet 332 of duct 33 of a respective operating element 30.

As example, with reference to FIG. 5, the shape and/or diameter of the first ring 40 is chosen so that the inlet 331 of the duct 33 of each operating element 30 is placed at the first connecting elements 45. Similarly, the shape and/or diameter of the second ring 50 is chosen so that the outlet 332 of duct 33 of each operating element 30 is placed at the second connecting elements 55.

The first ring 40 is provided with a first connector 41. Similarly, the second ring 50 is also provided with a second connector 51. Preferably, the first connector 41 and the second connector 51 are hollow.

By means of the first hollow connector 41 it is possible to feed a refrigerant fluid (e.g. by means of a pump, not shown) into the first cavity 43 of the first ring 40. The refrigerant fluid, flowing through the first connecting elements 45, enters via the inlet 331 into the duct 33 of each operating element 30. Inside the duct 33, the refrigerant fluid absorbs the heat of the operating element 30, cooling it, and, via the outlet 332 connected to the second connecting elements 55, flows to the second cavity 53 of the second ring 50. Finally, the refrigerant fluid flows out from the inner conduit of the second ring 50 via the second hollow connector 51. Preferably, the refrigerant fluid flowing out from the second hollow connector 51 flows to a heat exchanger, the heat exchanger disperses the heat absorbed by the fluid.

It has to be noted that the cooling of the stator 100 can be performed, in a similar way, flowing the refrigerant fluid in the opposite direction with respect to what is described above—i.e. introducing the refrigerant fluid from the second cavity of the second ring 50 via the second connector 51, and receiving said fluid from the first cavity 43 of the first ring 40 via the first connector 41.

It has to be noted that the refrigerant fluid flowing through the duct 33 of each operating element 30 cools the windings 20, said windings 20 thermally interacting with the adjacent operating element 30 exchanging heat with the refrigerant fluid itself.

It has to be noted that the refrigerant fluid, flowing in the first cavity 43 and in the second cavity 53, thermally interacts also with the first ring 40 and the second ring 50 cooling them.

Figure 4A:
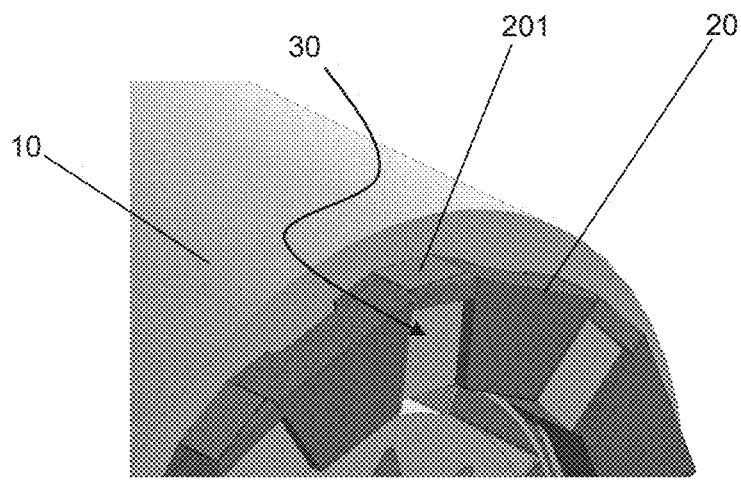
FIG. 4a is an enlarged view of a part of the stator of FIG. 3.

With reference to FIG. 4a, each operating element 30 is electrically connected to a respective adjacent winding 20 also referred to as winding 20 of competence. As example, each operating element 30 can engage a first end of the respective winding 20 by means of a connection plate 201.

Alternatively, the first end of the respective winding 20 can be welded directly to the operating element 30.

Each winding 20 is also provided with a second end (not shown in the figures). The second end of each winding 20 connects the winding 20 itself to other windings 20 allowing the circulation of the power supply current. As example, the windings 20 are connected, by means of their respective second end, in a configuration provided with one or more center tap.

With reference to FIGS. 1, 2, 3, each operating element 30 is provided with a tongue 35 extending from a surface of the operating element 30. Preferably, the tongue 35, the inlet 331 and the outlet 332 of the duct 33 are placed on the same surface of the operating element 30.

Preferably, the tongue 35 has basically a plate-shaped conformation, having a planar development, said planar development being basically parallel to the longitudinal development axis of the operating element 30.

Figure 4B:
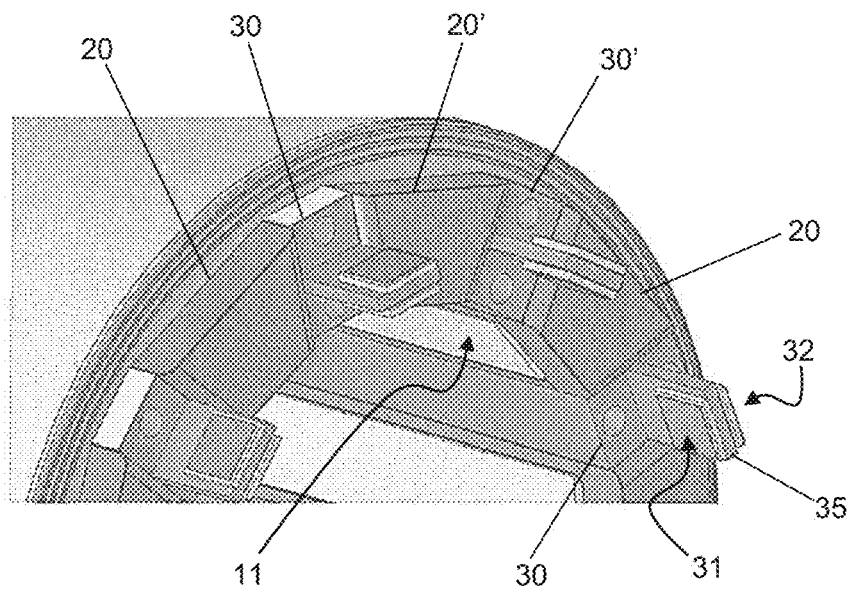
FIG. 4b is a further enlarged portion of a further part of the stator of FIG. 3.

As shown in FIG. 4b, each tongue 35 is provided with a first electronic switch 31 and a second electronic switch 32. Preferably, the first switch 31 and the second switch 32 comprise a power switch. For example, the power switch can be implemented with a technology chosen from: MOSFET, IGBT, BJT or the like. As example, each one of the first switch 31 and the second switch 32 comprises: a MOSFET transistor and a free-circulation diode (also known as a counterphase diode) connected in parallel to the MOSFET transistor. The operation of a MOSFET transistor in parallel with a free-circulation diode is known and will not be discussed in detail.

Preferably, the first and second switches 31, 32 are placed on opposite surfaces of the tongue 35.

Figure 6:
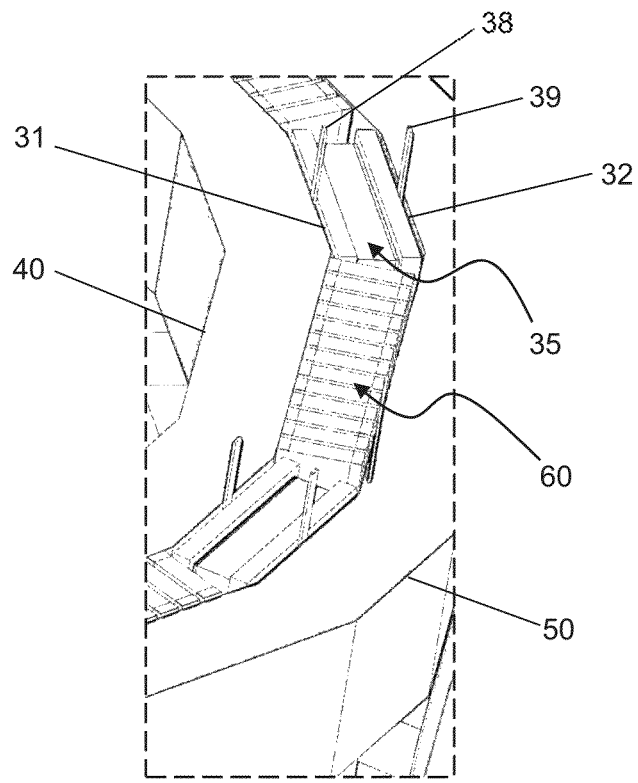
FIG. 6 is a further perspective view of an enlarged portion of the stator of FIG. 5.

As shown in FIG. 6, the tongue 35 of each operating element 30 is interposed between the first ring 40 and the second ring 50. Therefore, each first switch 31 is placed between the tongue 35 of the respective operating element 30 and the first ring 40; each second switch 32 is placed between the tongue 35 of the respective operating element 30 and the second ring 50. Preferably the first switch 31 is electrically connected with the first ring 40 and the second switch 32 is electrically connected with the second ring 50.

Each first and second switch 31, 32 is provided with a respective first and second control terminal 38, 39 suitable for opening or closing the respective switch 31, 32. In other words, the first switch 31 is provided with a first control terminal 38 allowing to open/close the first switch 31; similarly, the second switch 32 is provided with a second control terminal 39 allowing to open/close the second switch 32. Preferably, both the first control terminal 38 and the second control terminal 39 extend outwards the main body 10 of the stator 100.

Preferably, the first connector 41 of the first ring 40 and the second connector 51 of the second ring 50 allow to apply a potential difference between the first ring 40 and the second ring 50.

It has to be noted that, when each tongue 35 of each operating element 30 is interposed between the first ring 40 and the second ring 50, gaps are created. Preferably, a plurality of capacitive elements 60 are positioned within said gaps. Each capacitive element 60 is electrically connected between the first ring 40 and the second ring 50. Preferably, the capacitive elements 60 are configured as a DC-Link. In other words, considering the potential difference applied between the first ring 40 and the second ring 50, the capacitive elements 60 act as a buffer.

It has to be noted that, by means of the first control terminal 38 or on the second control terminal 39 of each operating element 30, it is possible to electrically connect the respective operating element 30 to the first ring 40 and/or to the second ring 50.

Figure 7:
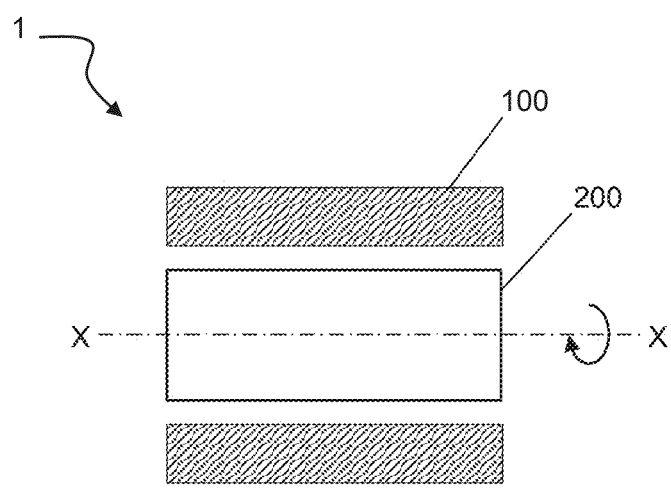
FIG. 7 is a block diagram of an electric machine according to an embodiment of the present invention.

As mentioned above, the stator 100 is a component of an electric machine 1. In said electric machine 1, the stator 100 is magnetically coupled to a rotor 200, said rotor 200 being capable of rotating around its own central axis X-X. As shown in the diagram in FIG. 7, the rotor 200 is placed inside the stator 100 and the main axis of stator 100 corresponds to the central X-X axis of rotor 200.

Preferably, the rotor 200 is a known permanent magnet rotor, while the stator 100 comprises, as example, nine windings 20. Each of said windings 20 is associated with a respective operating element 30, said windings 20 are connected together, by means of the second end of each windings 20, in a configuration with one or more center tap.

Preferably, the first ring 40 is connected to the negative pole of a DC power supply and the second ring 50 is connected to the positive pole of the same power supply.

The skilled person will note that, changing the first ring 40 and the second ring 50 polarity and driving accordingly each first control terminal 38 and each second control terminal 39—in other words, opening and closing each first switch 31 and each second switch 32 in an appropriate way—the electrical machine 1 essentially works as described above, therefore, a discussion of this configuration will not be described in detail below.

The power circuit suitable for supplying the windings 20 comprised in the stator 100, comprises: the first ring 40, the second ring 50 and each operating element 30. Furthermore, advantageously, the refrigerant recirculation system suitable for cooling the windings 20 during operation, also comprises: said first ring 40, said second ring 50 and each operating element 30, as described above.

In light of the above, the present invention provides several advantages.

The stator 100 comprises a cooling circuit and a power circuit that structurally share the same elements. Therefore, the fabrication costs of the stator 100 are reduced.

The power circuit and the cooling circuit are advantageously placed inside the stator 100 thus reducing the volume of electric machine 1.

The power electronics, being placed inside the stator 100, guarantees advantages in terms of electromagnetic and electrical compatibility and/or reduces the number of electrical and/or mechanical connections needed by the electrical machine 1.

Advantageously, the plurality of capacitive elements 60 allow the installation of electronic boards (for example, the driver board and the measurement board) near the stator 100 in an area shielded by the capacitive elements 60 themselves.

The invention claimed is:

1. A stator (100) for an electric machine (1) comprising:
   a hollow main body (10);
   a plurality of supporting teeth (11) extending along an inner surface of said main body (10);
   a plurality of windings (20), each one engaged to a respective one of said supporting teeth (11);
   a plurality of operating elements (30), each one interposed between two successive windings (20);
   wherein each operating element (30) is provided, internally, with a duct (33),
   said duct (33) being configured to flowing a refrigerant,
   each one of said operating elements (30) being suitable for thermally interacting with an adjacent winding of said windings (20) to cool said adjacent winding;
   each one of said operating elements (30) being in electrical contact with a respective winding (20) of competence, said winding (20) of competence being part of said plurality of windings (20), each operating element (30) being configured to be traversed by a current suitable for supplying said winding (20) of competence,
   wherein each operating element (30) defining at least an initial tract of said winding of competence (20).

2. The stator (100) according to claim 1 wherein:
   a. said stator (100) comprises a first ring (40) and a second ring (50);
   b. each operating element (30) is electrically connected to said first ring (40) by means of a first switch (31) and to said second ring (50) by means of a second switch (32);

c. each first switch (31) and each second switch (32) being configured to be driven by means of a respective command signal suitable for open/close said first switch (31) and/or said second switch (32).

3. The stator (100) according to claim 2 wherein said first ring (40) and said second ring (50) are basically coaxial, and preferably coaxial with respect to said main body (10).

4. The stator (100) according to claim 2 wherein said first ring (40) is mounted at one axial end of said main body (10), and said second ring (50) is mounted at one axial end of said main body (10), said first and second ends being preferably the same axial end of said main body (10).

5. The stator (100) according to claim 2 wherein said first ring (40) and said second ring (50) are respectively provided with a first connector (41) and a second connector (51), said first connector (41) and said second connector (51) being configured to allow the application of a potential difference between said first ring (40) and said second ring (50).

6. The stator (100) according to claim 2, wherein said stator (100) comprises a plurality of capacitive elements (60), connected between said first ring (40) and said second ring (50), said capacitive elements (60) being configured as a DC-Link.

7. The stator (100) according to claim 1 wherein said duct (33) has an inlet (331) and an outlet (332), preferably formed on the same surface of said operating element (30).

8. The stator (100) according to claim 2, wherein:
a. said first ring (40) is provided with a first cavity (43) and comprises first connecting elements (45) coated with an electrically insulating material;
b. said second ring (50) is provided with a second cavity (53) and comprises second connecting elements (55) coated with an electrically insulating material;
c. said first connecting elements (45) providing a fluid communication between said first cavity (43) and the duct (33) of each of said operating elements (30);
d. said second connecting elements (55) providing a fluid communication between said second cavity (53) and the duct (33) of each of said operating elements (30).

9. The stator (100) according to claim 8, wherein said first connector (41) and said second connector (51) are hollow and allow the passage of said refrigerant fluid inside said first cavity (43) and said second cavity (53).

10. The stator (100) according to claim 1, wherein said operating elements (30) have an elongated shape provided with a longitudinal development direction, said longitudinal development direction being parallel to a central axis of said main body (10).

11. The stator (100) according to claim 1 wherein said operating elements (30) are circumferentially arranged along the inner surface of said main body (10).

12. The stator (100) according to claim 1, wherein each one of said operating elements (30) comprises a tongue (35) interposed between said first ring (40) and said second ring (50), wherein said first switch and said second switch (31, 32) are preferably positioned on respective opposite surfaces of said flap tongue (35).

13. An electric machine (1) comprising:
a. a stator (100) according to claim 1;
b. a rotor (200) magnetically coupled to said stator (100), said rotor (200) being coaxial with respect to said stator (100) and suitable for rotating about its own central axis (X-X).

14. The stator (100) according to claim 1, wherein an intermediate layer is placed between a respective operating element (30) and the adjacent winding (20); said intermediate layer housing the coils of the adjacent winding (20); said intermediate layer electrically insulating the adjacent winding (20) from the operating element (30).

* * * * *